United States Patent
Würl et al.

[11] Patent Number: 5,935,494
[45] Date of Patent: Aug. 10, 1999

[54] INJECTION-MOLDING MACHINE FOR PLASTIC WITH ROTARY AND LINEAR DRIVE

[75] Inventors: Ernst Würl, Höttingen; Helmut Schreiner, Nürnberg, both of Germany

[73] Assignee: Mannesmann Aktiengesellschaft, Düesseldorf, Germany

[21] Appl. No.: 08/785,858

[22] Filed: Jan. 21, 1997

[30] Foreign Application Priority Data

Jan. 18, 1996 [DE] Germany ............................. 196 03 012

[51] Int. Cl.$^6$ .................................................. B29C 45/82
[52] U.S. Cl. .................... 264/40.1; 264/40.7; 264/328.1; 425/145; 425/587
[58] Field of Search ................................ 264/328.1, 40.1, 264/40.5, 40.7, 328.17, 349; 425/145, 586, 587, 166

[56] References Cited

U.S. PATENT DOCUMENTS

| | | | |
|---|---|---|---|
| 3,317,962 | 5/1967 | Morse | 425/587 |
| 3,319,298 | 5/1967 | Kiraly | 425/587 |
| 3,666,141 | 5/1972 | Ma et al. | 425/587 |
| 3,888,393 | 6/1975 | Drori | 425/587 |
| 4,712,991 | 12/1987 | Hehl | 425/145 |
| 4,798,527 | 1/1989 | Gunda | 425/145 |
| 5,002,717 | 3/1991 | Taniguchi | 425/587 |
| 5,018,950 | 5/1991 | Reinhart | 425/145 |

FOREIGN PATENT DOCUMENTS

| | | |
|---|---|---|
| 135 876 | 6/1979 | Germany . |
| 39 37 099 | 5/1990 | Germany . |
| 540 88 963 | 7/1979 | Japan . |

*Primary Examiner*—Jill L. Heitbrink
*Attorney, Agent, or Firm*—Cohen, Pontani, Lieberman & Pavane

[57] ABSTRACT

An injection-molding machine for plastic, including an injection cylinder, a screw arranged in the injection cylinder and having a drive shaft, an electric motor, a mechanical rotary drive for connecting the electric motor to the drive shaft so that rotary motion is imparted to the drive shaft, and a linear drive for connecting the electric motor to the drive shaft so that linear motion is imparted to the drive shaft. The linear drive includes a pressure medium pump connected to the electric motor, and at least one synchronous piston-cylinder unit connected to the drive shaft and in fluid communication with the pump. A control unit is connected to the pump for controlling one of pump and motor absorption level. Hydraulic lines are configured and arranged to directly connect an input of the synchronous cylinder with an output of the pump and an output of the synchronous cylinder with an input of the pump in a closed hydraulic circuit.

14 Claims, 2 Drawing Sheets

INJECTION-MOLDING MACHINE FOR PLASTIC WITH ROTARY AND LINEAR DRIVE

BACKGROUND OF THE INVENTION

1. Field of the Invention

The invention relates to an injection-molding machine for plastic with a screw that is located in an injection cylinder. By means of a single electric motor, the screw is moved by a mechanical rotary drive, which is connected to the drive shaft of the screw, and by a linear drive. The linear drive is connected by a piston-cylinder unit, which is moved by a pressure medium pump connected to the electric motor.

2. Discussion of the Prior Art

A drive arrangement, especially for injection-molding machines, is known from German reference DD 135 876. This arrangement has a shared variable-speed electric motor, which drives the plasticizing screw directly via a clutch or clutches of additional power-transmitting machine elements. At the same time the motor is flanged to the drive shaft of the hydraulic pumps of the electric motor, in order to drive the pressure flow user.

Another injection-molding machine for plastic is known from German reference DE 39 37 099. This machine has a shared electric driving motor that causes the screw to rotate as the plastic granulate is plasticized. The driving motor then presses the injection unit in the direction of the discharge opening by the distance of the injection stroke. The rotary drive and the injection unit are connected by a variable-speed transmission to a driving motor shared by both. To permit execution of the linear movement after the rotary movement, a clutch is provided in the transmission. The clutch disconnects the pressure medium pump from the driving motor.

In the known injection-molding machines for plastic, it is disadvantageous that the transmission sometimes continues to operate during the operation of the driving motor. In addition, the pump in an open hydraulic circuit can be driven only in one direction.

SUMMARY OF THE INVENTION

Accordingly, it is an object of the present invention to provide a simple linear and rotary drive, which can be operated quietly and in an energy-saving manner, for the screw in an injection-molding machine for plastic.

Pursuant to this object, and others which will become apparent hereafter, one aspect of the present invention resides in an injection molding machine for plastic which includes an injection cylinder, a screw arranged in the injection cylinder and having a drive shaft, an electric motor, mechanical rotary drive means for connecting the electric motor to the drive shaft so as to impart rotary motion to the drive shaft, and linear drive means for connecting the electric motor to the drive shaft so that linear motion is imparted to the drive shaft. The linear drive means includes a pressure medium pump connected to the electric motor and at least one synchronous piston-cylinder unit connected to the drive shaft and in fluid communication with the pump. Control means are connected to the pump for controlling absorption level of the pump. Furthermore, hydraulic lines are arranged to directly connect an input of the synchronous cylinder with an output of the pump and an output of the synchronous cylinder with an input of the pump in a closed hydraulic circuit.

The invention utilizes a single shared driving motor, preferably a servo-electric motor, for the linear and the rotary movement. At least for the linear movement, the driving motor is connected to a hydraulic pump, the delivery direction of which is reversible. In a closed hydraulic circuit, by means of in-step cylinders, the hydraulic pump implements the linear movement of the screw in a manner dependent on the direction of delivery.

The rotary drive is conveyed to the screw via a transmission, so that the driving moment can be adjusted to that which is required. The passive linear force simultaneously required on the screw (which exercises ramming pressure on the conveyed mass) for the purpose of linear drive generates, at the in-step cylinder of the linear drive, an oil flow toward the hydraulic pump. In this phase, the hydraulic pump functions as an oil motor and the torque created, as the result of the rigid connection of the pump to the motor, is transmitted to the motor in the form of driving moment. Thanks to this type of connection, power is recovered in a simple manner. The pump is used as a sort of brake in the linear circuit and the braking energy is reused for the rotary drive.

The ramming pressure—and, in consequence, the magnitude of braking energy—is regulated by changing the pumping or motor absorption level, which is subject to a separate control circuit. The linear drive of the screw is implemented by means of in-step cylinders in the closed circuit using pumps. The pumps can be equipped with a mechanism to reverse the direction of delivery depending on the pivoting angle.

For active linear operation, during which the pump always rotates in the direction counter to the rotary drive, the delivery direction of the pump is changed in accordance with the movement direction. The pumping pressure and quantity can be regulated by influencing the pivoting angle of the pump and also by influencing the speed and driving moment via the driving motor.

To prevent the screw from rotating backward during active linear drive, the drive train of the rotary drive can be separated mechanically. This separation is carried out by means of a separable clutch or, when a freewheel is used, automatically given the appropriate rotational direction.

The ramming pressure between the screw and the injection cylinder is transmitted directly to the in-step cylinder and thus to the closed hydraulic circuit. The use of a pump that allows the delivery direction of the hydraulic medium to be set as desired makes it possible to sensitively adjust the ramming pressure of the plastic mass using simple means and regardless of the rotational direction of the electric motor. If needed—for example, at the end of an injection cycle—it is possible to provide compression relief for the plastic mass by reducing the pressure in the hydraulic system, so that no excess outflow of the plastic mass from the nozzle occurs.

The mechanical drive for rotation, like the hydraulic drive for linear movement, is constructed in a simple manner. It has only a few elements and can easily be screened against noise by simple encapsulation of the aggregates. This embodiment also permits simple encapsulation of the aggregates against leakage and noise.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
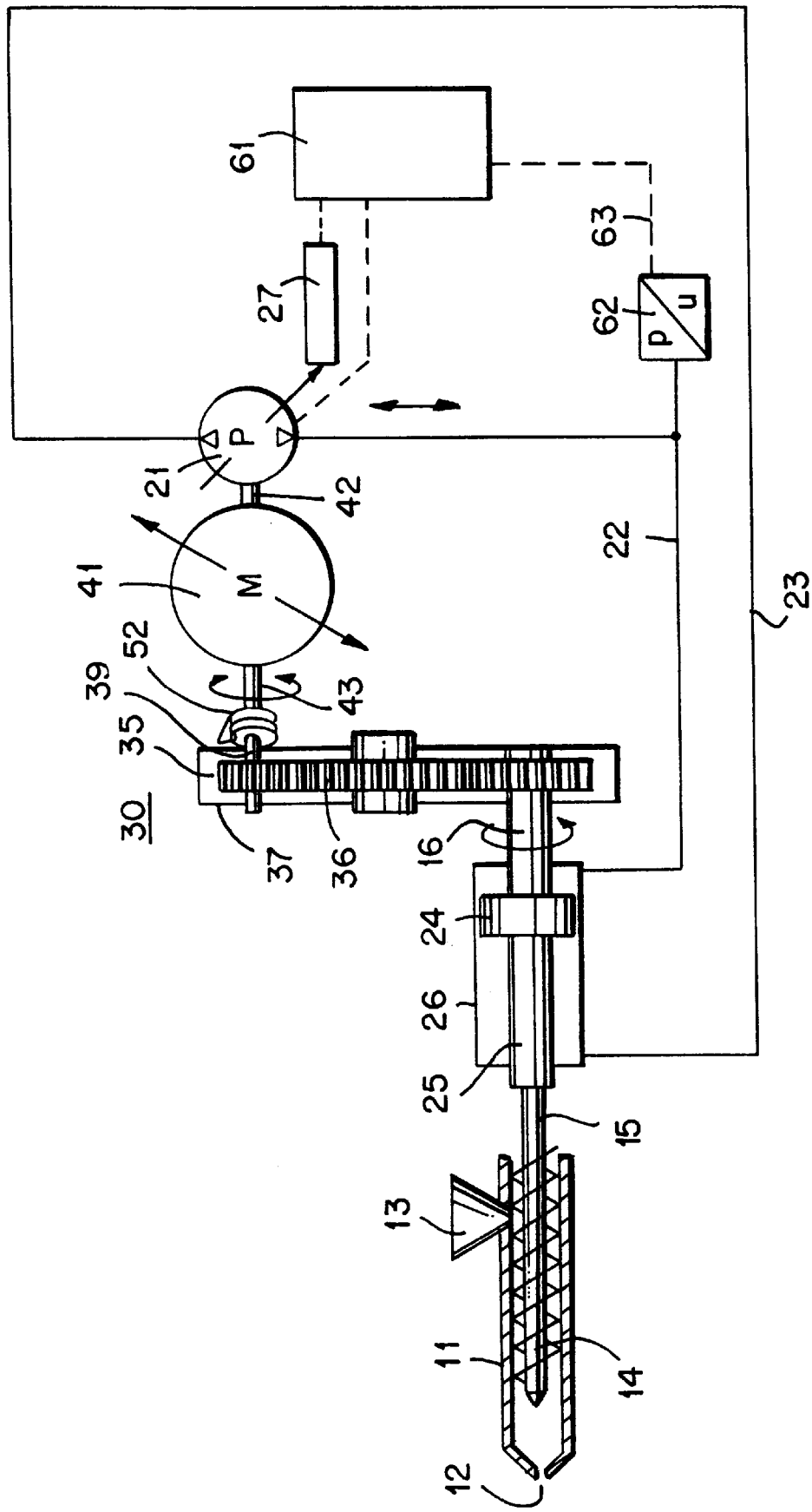
FIG. 1 is a diagram of an injection-molding machine for plastic with a central piston-cylinder unit pursuant to the present invention.
Figure 2:
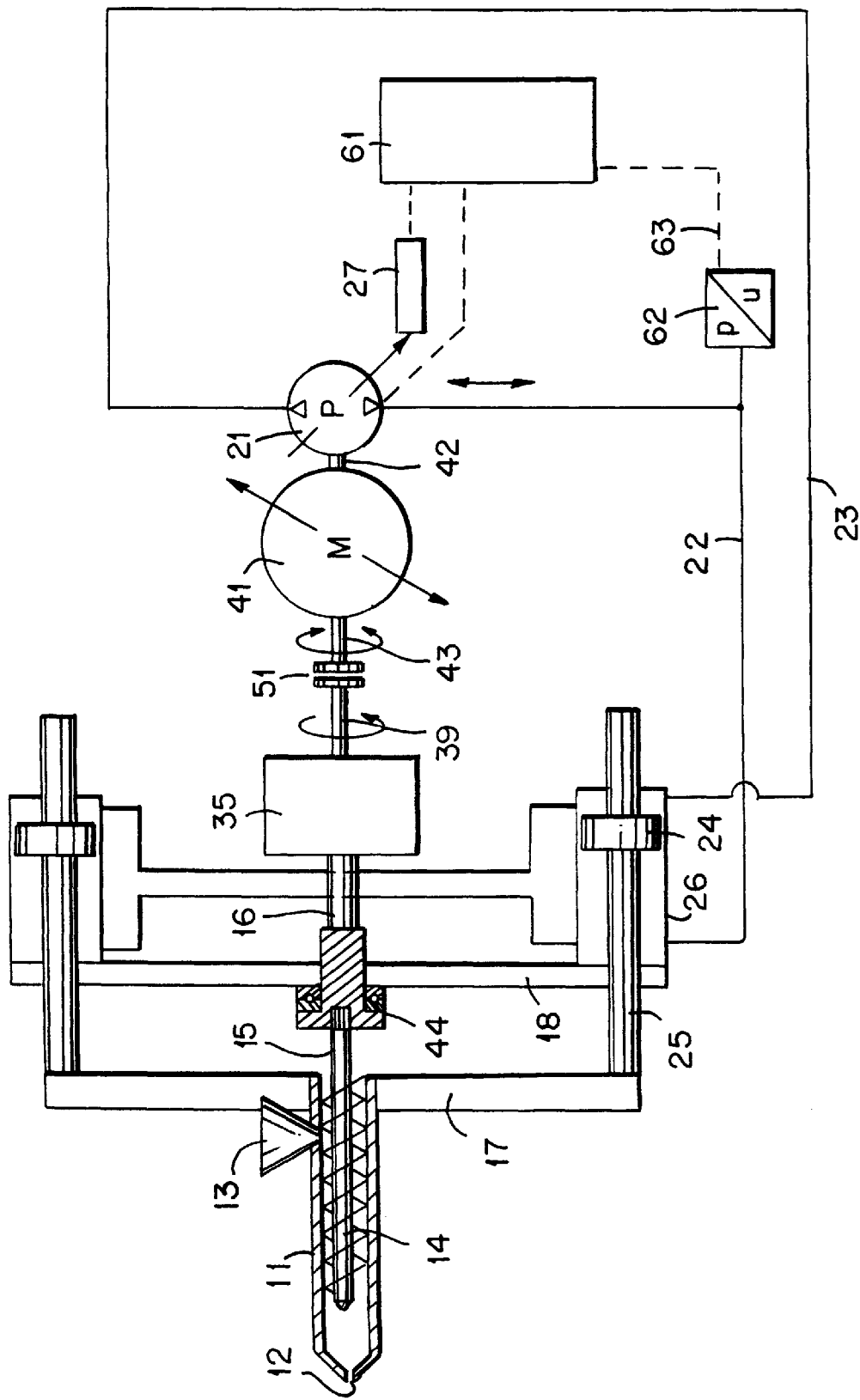
FIG. 2 is a diagram of an injection-molding machine for plastic with two parallel hydraulic cylinder units.

FIGS. 1 and 2 show an injection cylinder 11 with a discharge opening 12, a holding container 13 and a concentrically-arranged screw 14. The screw 14 is connected by a screw-side drive shaft 15 to a piston rod 25 of a synchronous unit that has a piston 24 and a cylinder 26. On the motor side, the piston rod 25 is connected to a drive shaft 16, on which an electric drive motor 41 acts, via a transmission 35. The transmission 35 has an input shaft 39, which can be separated from the drive shaft 43 of the motor 41 by means of a clutch mechanism 51 or a freewheel 52.

The electric drive motor 41, which is embodied as a servo motor, has a second output shaft 42, which is connected to a pressure medium pump 21.

The pressure medium pump 21 is connected to the synchronous cylinder 26 by a first hydraulic line 22 and a second hydraulic line 23. The delivery direction of the pump can be changed by changeover elements 27. The changeover elements 27 are connected to a control device 61, which in turn is connected via a measurement line 63 to a pressure sensor 62, which is connected to the hydraulic line 22. The control device 61 is also connected to the pressure medium pump 21 for controlling an absorption level of the pump when the pump is operated as a hydraulic motor for transmitting brake energy to the electric drive motor 41.

In FIG. 1, the transmission 35 has a housing 37, in which transmission gears 36 are arranged.

In FIG. 2, two synchronous cylinders 26 are connected by a counter-yoke 18. The piston rods 25 of the cylinders 26 are connected to one another by a yoke 17. There is also a pressure bearing 44, which is located between the counteryoke 18 and the screw-side drive shaft 15.

The invention is not limited by the embodiments described above which are presented as examples only but can be modified in various ways within the scope of protection defined by the appended patent claims.

We claim:

1. A process for operating an injection-molding machine for plastic, which machines includes an injection cylinder, a screw arranged in the injection cylinder and having a prechamber containing a mass of the plastic for molding, a drive shaft, an electric motor, a mechanical rotary drive means for connecting the electric motor to the drive shaft so that rotary motion is imparted to the drive shaft, linear drive means for connecting the electric motor to the drive shaft so that linear motion is imparted to the drive shaft, the linear drive means including a pressure medium pump connected to the electric motor, and at least one synchronous piston-cylinder unit connected to the drive shaft and in fluid communication with the pump, control means connected to the pump for controlling an absorption level of the pump, hydraulic lines configured and arranged to directly connect an input of the synchronous cylinder with an output of the pump and an output of the synchronous cylinder with an input of the pump in a closed hydraulic circuit, the process comprising the steps of:

maintaining a single rotational direction of the motor, in order to permit movement of the linear drive means in both directions;

reversing a flow delivery direction of the pressure medium pump; and implementing at least one of speed and torque control using the electric motor.

2. A process as defined in claim 1, including setting the absorption level of the pressure medium pump so that, as hydraulic pressure is exactly maintained in dependence on the ramming pressure of a plastic mass in a prechamber of the screw, excess braking energy is supplied to the electric motor.

3. A process as defined in claim 1, including setting a delivery direction of the pressure medium pump so that the hydraulic linear drive means causes compression relief in a ramming area of the screw.

4. A process for operating an injection-molding machine for plastic, which machine includes an injection cylinder, a screw arranged in the injection cylinder and having a prechamber containing a mass of the plastic for molding, a drive shaft, an electric motor, a mechanical rotary drive means for connecting the electric motor to the drive shaft so that rotary motion is imparted to the drive shaft, linear drive means for connecting the electric motor to the drive shaft so that linear motion is imparted to the drive shaft, the linear drive means including a pressure medium pump connected to the electric motor, and at least one synchronous piston-cylinder unit connected to the drive shaft and in fluid communication with the pump, control means connected to the pump for controlling an absorption level of the pump, hydraulic lines configured and arranged to directly connect an input of the synchronous cylinder with an output of the pump and an output of the synchronous cylinder with an input of the pump in a closed hydraulic circuit, the process comprising the steps of:

operating the pressure medium pump as a motor; and setting pressure of displaced hydraulic oil of the linear drive means in a predeterminable manner in dependence on ramming pressure when the pump is operated as a motor.

5. A process as defined in claim 4, including setting the absorption level of the pressure medium pump so that, as hydraulic pressure is exactly maintained in dependence on the ramming pressure of a plastic mass in a prechamber of the screw, excess braking energy is supplied to the electric motor.

6. An injection-molding machine for plastic, comprising:

an injection cylinder;

a screw arranged in the injection cylinder and having a drive shaft;

an electric motor;

mechanical rotary drive means for connecting the electric motor to the drive shaft so that rotary motion is imparted to the drive shaft;

linear drive means for connecting the electric motor to the drive shaft so that linear motion is imparted to the drive shaft, the linear drive means including a pressure medium pump connected to the electric motor, and at least one synchronous piston-cylinder unit connected to the drive shaft and in fluid communication with the pump, whereby the pump can selectively function as a pump and a hydraulic motor;

control means connected to the pump for controlling an absorption level of said pump; and hydraulic lines configured and arranged to directly connect an input of the synchronous cylinder with an output of the pump and an output of the synchronous cylinder with an input of the pump in a closed hydraulic circuit.

7. An injection-molding machine for plastic as defined in claim 6, wherein the electric motor is a servo motor.

8. An injection-molding machine for plastic as defined in claim 6, wherein the pressure medium pump is configured so that a reversal of delivery flow can be carried out, without a change in rotational direction.

9. An injection-molding machine for plastic as defined in claim 6, wherein the pressure medium pump is configured so as to function as a motor which transmits pressure differences back to the electric motor in torque form.

10. An injection-molding machine as defined in claim 9, and further comprising a coupling mechanism arranged between the electric motor and the mechanical rotary drive means.

11. An injection-molding machine as defined in claim 10, wherein the coupling mechanism is configured as a clutch.

12. An injection-molding machine as defined in claim 10, wherein the coupling mechanism is configured as a freewheeling device.

13. An injection-molding machine as defined in claim 6, wherein the linear drive means includes at least two piston-cylinder units, and further comprising a yoke arranged to connect the at least two piston-cylinder units to the injection cylinder, a counteryoke arranged to connect the piston-cylinder units to the screw drive shaft, and an axial bearing arranged to support the drive shaft.

14. An injection-molding machine as defined in claim 6, and further comprising a pressure sensor arranged in one of the hydraulic lines, and a measurement line arranged to operatively connect the control device to the pressure sensor.

* * * * *